United States Patent [19]

Gierer

[11] Patent Number: 4,896,568
[45] Date of Patent: Jan. 30, 1990

[54] ELECTRIC-HYDRAULIC CONTROL

[75] Inventor: Georg Gierer, Kressbronn, Fed. Rep. of Germany

[73] Assignee: Zahnradfabrik Friedrichshafen AG, Friedrichshafen, Fed. Rep. of Germany

[21] Appl. No.: 272,835

[22] PCT Filed: Apr. 23, 1987

[86] PCT No.: PCT/EP87/00219
§ 371 Date: Oct. 26, 1988
§ 102(e) Date: Oct. 26, 1988

[87] PCT Pub. No.: WO87/06669
PCT Pub. Date: Nov. 5, 1987

[30] Foreign Application Priority Data

May 2, 1986 [LU] Luxembourg ...... PCT/EP86/00262

[51] Int. Cl.⁴ .................................... B60K 41/16
[52] U.S. Cl. ................................. 74/861; 74/867
[58] Field of Search .................... 74/866, 867, 861

[56] References Cited

U.S. PATENT DOCUMENTS 4,351,206 9/1982 Lemieux et al. ............... 74/866
4,393,732 7/1983 Suzuki et al. ................. 74/867 X
4,494,423 1/1985 McCarthy et al. ............. 74/867 X

FOREIGN PATENT DOCUMENTS 0256653 12/1985 Japan ........................... 74/861
0256655 12/1985 Japan ........................... 74/861

Primary Examiner—Dirk Wright
Attorney, Agent, or Firm—Herbert Dubno

[57] ABSTRACT

Electro-hydraulic control for an automatic transmission (1) is disclosed with two primary shafts (11, 12), whereby the first shaft (11) is connected with a turbine (21) of a hydrodynamic unit (2) and the second shaft (12) is directly connected to the driving shaft (31) of a driving motor (3) and the driving output is directed depending on speed, individually or by power split, to the for instance stepped-down planetary gear with a selecting slide (4) at least for the neutral position (N), as well as the forward drive- (D) and the reverse drive position (R) and an electronic control device (5) with solenoid valves (6), kept in zero position by spring force, for a pressure-medium source (7), pressure- and switch valves and dampers for the actuation of gear shift couplings and brakes (A-E), whereby between a solenoid valve (6) and the gear shift couplings for the highest speed (E) as well as the reverse drive (B) an emergency valve (8/9) is interposed. This way, in case of current failure an uninterrupted drive over the coupling (E) via mechanical transmission is possible and a forward- and reverse drive and a start is possible in both these directions over the reverse speed coupling (B).

3 Claims, 2 Drawing Sheets

|      | A | B | C | C' | D | E |
|------|---|---|---|----|---|---|
| G.1  | X |   |   |    | X |   |
| G.2  | X |   | X | X  |   |   |
| G.3  | X |   | X |    |   | X |
| G.4  |   |   | X | X  |   | X |
| G.R  |   | X |   |    | X |   |
| NOT.G.3 | X |   | X |    |   | X |
|      | X | X | X |    |   |   |

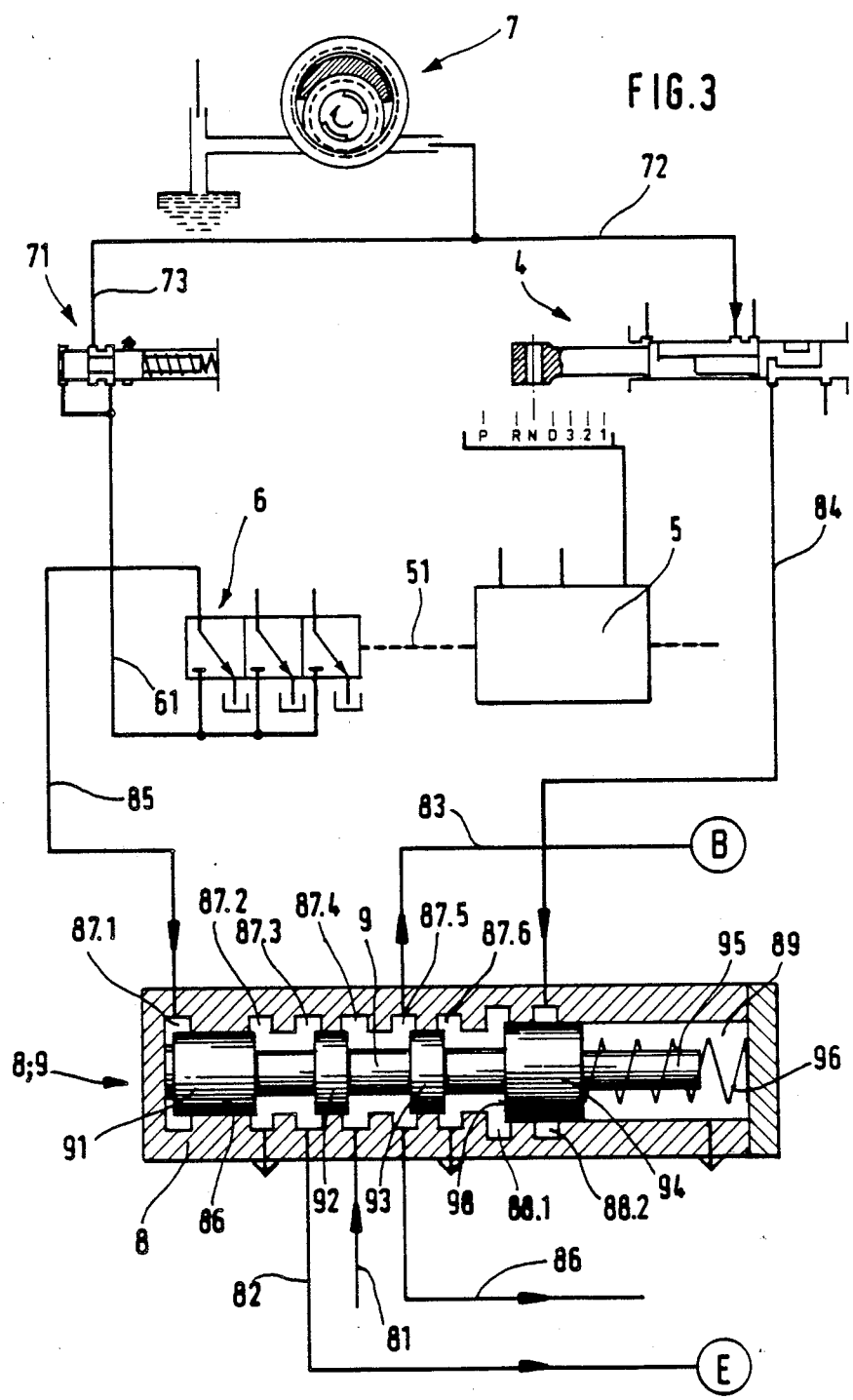

ELECTRIC-HYDRAULIC CONTROL

FIELD OF THE INVENTION

The invention relates to an electric-hydraulic control for an automatic transmission.

THE RELATED ART

Electric-hydraulic controls are known, particularly for transmissions having only one primary shaft, wherein the output of a driving engine is directed over a hydrodynamic unit and this can be bridged with, for instance, a converter coupling. Pressure-and switch valves are therein arranged to insure that in emergency, such as a failure of the electric system, driving can continue. Normally, system failures present no insurmountable problem; since the drive in all speeds takes place over the hydrodynamic unit, it is possible to stop and then again to start, without turning off or throttling the engine.

However, more difficult problems arise when the output flow is directed over the hydrodynamic unit only in some of the speeds, for instance where Speed 1, 2 and R, and 4 is transmitted purely mechanically and Speed 3 by power split, which means partially purely mechanically and partially over the hydrodynamic unit.

It is therefore the object of the invention to further improve an electro-hydraulic control for a transmission with two primary shafts, so that in case of current-supply failure it is possible to continue to drive at a certain speed, to stop and to start again or even to drive in reverse.

SUMMARY OF THE INVENTION

An electro-hydraulic control for an automatic transmission is provided comprising:

a hydrodynamic unit having a turbine;

a driving unit having a driving shaft and delivering a driving output;

a first and second primary shaft, the shafts being respectively connected to the turbine and to the driving shaft;

a stepped-down planetary coupling gear receiving the driving output, the received output dependent upon a means selected from the group consisting of separate gear speeds and power-split gear speeds;

a selecting slide for choosing a neutral gear position, a drive gear position and a reverse gear position;

an electronic device communicating with the selecting slide with a plurality of solenoid valves kept in a zero position by a spring means communicating with the electronic device;

a hydraulic pressure means including a pressure source, pressure-and switch valves, and dampers for actuating speed shift couplings and brakes; and an emergency valve designed as a stop valve capable of operating in mutual relationship the solenoid valves and shift couplings controlling a highest speed gear and reverse gear.

By providing an emergency valve between the solenoid valve and the shifting couplings, once for the mechanical speed and once for the R-speed, it is possible to actuate these couplings via the selecting lever, even when the solenoid valves fail. The coupling, commonly known as a clutch, which under normal operation conditions is used only for the R-speed, in the drive position of the selecting slide, can also be used for driving in connection with the hydrodynamic unit. As a result, starting in drive or reverse is also possible with the corresponding position change of the selecting slide.

Upon a current supply failure while the transmission is in drive gear, the shift coupling for the highest speed is actuated by hydraulic pressure to allow purely mechanical transmission through the second shaft to continue drive operation. A change in position of the selecting slide into a neutral gear position and again back into the drive gear position causes a repositioning of the emergency valve. Thereby it becomes possible through a drive coupling to drive over the hydrodynamic unit, the first primary shaft and also to start.

The emergency valve can comprise a recess sleeve valve having three control pistons on one end thereof with the same diameters, a control piston at a second end thereof with a larger diameter than that of the control pistons and a stop pin on the second end. A recessed cylindrical bore may be present wherein the sleeve valve is supported in an axially slidable fashion, the bore being provided with annular spaces cooperating with the control pistons. A pressure spring arranged in a spring area of the bore may be a further feature, this spring being wound around the stop pin and pressed against the sleeve valve. There are also a plurality of feed lines leading into and exiting from the annular spaces transmitting therethrough an activating pressure medium.

In case of current-supply failure during driving, it is possible to reach approximately 80% of the maximum speed via the mechanical drive by use of the emergency valve when designed as a stop valve. This valve can be kept in the end position against its spring pressure due to system pressure, even without the control pressure coming from the solenoid valve. In emergency, it is possible to start in drive as well as in reverse. This possibility arises from the advantageous arrangement of the connections in the emergency valve in cooperation with the R-clutch, and this solely by changing the position of the selecting slide, i.e. without any electrical assistance.

The invention is not restricted to the combination of features defined in the claims. For the skilled in the art, further clever combination possibilities of the claims and of the individually claimed features arise.

BRIEF DESCRIPTION OF THE DRAWING

Further details of the invention are explained with the aid of the drawing and embodiment examples. The drawings shows:

FIG. 3 which is a control diagram, illustrated in a simplified manner, with the emergency valve.

DETAILED DESCRIPTION

Figures 1, 2:
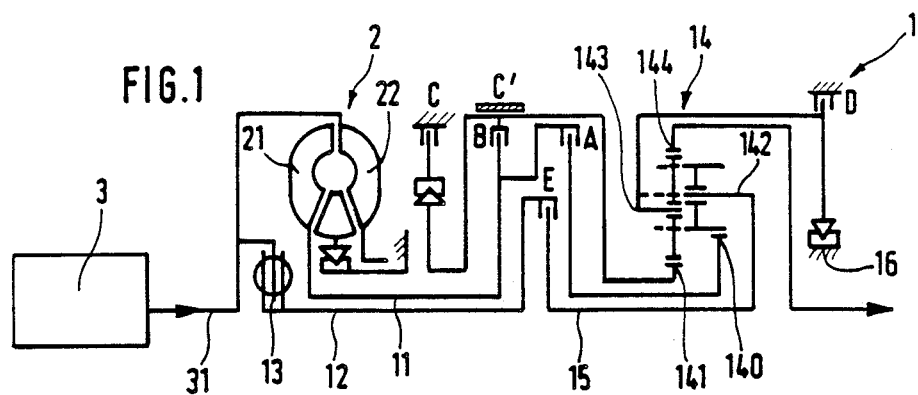
FIG. 1 which is a schematic representation of an automatic transmission.
FIG. 2 which is a table showing the clutches and brakes involved in each of the individual speeds.

In FIG. 1, a driving engine 3 is connected over driven shaft 31 to pump 22 of a hydrodynamic unit 2. A further engine connection is over a damper 13, with a second primary shaft 12, at whose end a coupling E is arranged and which leads via an internal shaft 15 to a flange 142 of a stepped-down planetary coupling gear 14. The first primary shaft 11 leads from the turbine 21 of the hydrodynamic unit 2 to the couplings A and B, whose other half is each connected to a sun wheel 140, 141 of the stepped-down planetary coupling gear 14. On the second half of the coupling B, a brake C′, and, over a freerunning switching operation, a further brake C are also arranged. The second flange 143 of the stepped-down planetary coupling gear 14 is connected to a free-wheeling switching arrangement 17, supported on the transmission housing 16 and to a brake D, and the output from the transmission 1 takes place over the hollow wheel 144 of the stepped-down planetary coupling gear 14.

As can be easily seen from the table in FIG. 2, the output of the driving engine 3 is always directed over the hydrodynamic unit 2 into the stepped-down planetary coupling gear 14, in the 1st, 2nd and R-speeds. However, in the fourth speed, the power transmission takes place over the coupling E and thereby is purely mechanical, and in the 3rd speed, there is a power split, i.e. it takes place partially over the hydrodynamic unit 2 and partially over the internal shaft 15.

In the control diagram shown at a reduced scale in FIG. 3, the electronic control device 5 is connected electrically with the solenoid valve 6. A system pressure produced by a pressure-medium source 7 is directed over the duct 72 to the selecting slide and over the duct 73 to the pressure-reducing valve 71. Over the duct 61, this reduced pressure is supplied as control pressure to the solenoid valves, e.g. solenoid valve 6. The emergency valve 8/9 has a sleeve valve 9 with recesses, having three control pistons 91, 92, 93 of equal diameter on the one side and a control piston 94 with a larger diameter and a stop pin 95 on the other side and is axially slidably supported in a housing 8 with a recessed cylindrical bore. Further, annular spaces 87/1 to 87/6 are provided at the smaller diameter of the cylindrical bore and annular spaces 88/1 to 88/2 are provided at the large bore. A control-pressure duct 85 leads to the first also frontally arranged annular space 87/1 and an actuation pressure duct (system pressure) 81 leads to the fourth annular space 87/4. The system-pressure duct 84, coming from the selecting slider 4 leads into the annular space 88/2. The fifth annular space 87/5 is connected with the coupling B via the feed line 83, and the third annular space 87/3 is connected over the feed line 82 with the coupling E. A duct 86 also leads to a slide valve (not shown in the drawing) which, when the coupling B is acted upon, simultaneously shuts off the coupling A (not shown). A spring 96 is arranged in the recessed cylindrical bore with the large diameter (spring area 89) and rests on one side on the frontal side of this bore and on the other side on the larger piston 94 of the recessed sleeve valve 9.

The electro-hydraulic control works as follows. During normal driving, by changing the position of the selecting slide 4 from N to for instance D, the drive position, the third solenoid valve 6 is switched on. As a result, over the duct 61/85 a control pressure is directed to the first outer annular space 87/1. The recessed sleeve valve 9 is pushed to the right, against the pressure of the spring 96, until it reaches the stop pin, so that over the eighth annular space 88/2 and the duct 84, system pressure is supplied to the emergency valve 8/9. This happens in the entire drive range, because the selecting slider 4 is so designed that from the pressure-medium source 7, over the duct 72 the duct 84 is actuated with system pressure, when the selecting slide 4 is moved in the drive position. Thereby, the recessed sleeve valve 9 is kept in its right end position, via the annular space 98 at the large control piston 94. In this position, over the feed line 81 in the range of the third and fourth speed and over the fourth annular space 87/4, actuation means (system pressure) is transmitted to the coupling E via the third annular space 87/3 and the feed line 82. In this position, during driving, the coupling E is always actuated.

In the case of current failure, the emergency valve remains in this position as a result of the holding function over the system pressure coming from duct 84, and the coupling E, connecting the second primary shaft 12 with the internal shaft 15 remains closed, so that it is possible to continue to drive in the third speed range, purely mechanically, with full power. However, it is not possible to start in this position of the emergency valve. When the current failure takes place in the position N, i.e. in the neutral position, for instance when the vehicle is stopped, the emergency valve remains in the illustrated position during the changing of the position of the selecting slide 4 from N to D, since there is no steering-control current. Thereby the coupling B is acted upon via the system pressure duct 81 and the feed line 83, so that the output of the driving motor 3 is transmitted via the hydrodynamic unit 2 and the first primary shaft 11 and the coupling B to the sun wheel 141 of the stepped-down planetary coupling gear 14. In this position, it is possible to start in drive, as well as in reverse.

A shifting is possible from coupling E, which is the purely mechanical output transmission, to the coupling B during driving, due to the shifting from the position D to N and then again to D, so that thereby the drive can continue over the hydrodynamic unit 2, without interruption, and it can also be stopped at any time and restarted.

I claim:
1. An electro-hydraulic control for an automatic transmission comprising:
   a hydrodynamic unit having a turbine;
   a driving unit having a driving shaft and delivering a driving output;
   a first and second primary shaft, said shafts being respectively connected to said turbine and to said driving shaft;
   a stepped-down planetary coupling gear receiving said driving output, said received output dependent upon a means selected from the group consisting of separate gear speeds and power-split gear speeds;
   a selecting slide for choosing a neutral gear position, a drive gear position and a reverse gear position;
   an electronic device communicating with said selecting slide with a plurality of solenoid valves kept in a zero position by a spring means communicating with said electronic device;
   a hydraulic pressure means including a pressure source, pressure-and switch valves, and dampers for actuating speed shift couplings and brakes;
   an emergency valve designed as a stop valve capable of operating in mutual relationship said solenoid valves and shift couplings controlling a highest speed gear and reverse gear; and
   whereupon a current failure, while the transmission is in drive gear causes activation of said shift coupling for said highest speed gear by hydraulic pressure to allow purely mechanical transmission through said second shaft to continue drive operation, and a change in position of said selecting slide into said neutral gear position and again back into said drive gear position causes a repositioning of said emergency valve so that through a drive coupling it becomes possible to drive over said hydrodynamic unit, over the first primary shaft and also to start.

2. An electro-hydraulic control for an automatic transmission comprising:

a hydrodynamic unit having a turbine;

a driving unit having a driving shaft and delivering a driving output;

a first and second primary shaft, said shafts being respectively connected to said turbine and to said driving shaft;

a stepped-down planetary coupling gear receiving said driving output, said received output dependent upon a means selected from the group consisting of separate gear speeds and power-split gear speeds;

a selecting slide for choosing a neutral gear position, a drive gear position and a reverse gear position;

an electronic device communicating with said selecting slide with a plurality of solenoid valves kept in a zero position by a spring means communicating with said electronic device;

a hydraulic pressure means including a pressure source, a pressure-and switch valves, and dampers for actuating speed shift couplings and brakes;

an emergency valve designed as a stop valve capable of operating in mutual relationship said solenoid valves and shift couplings controlling a highest speed gear and reverse gear; and whereupon a current failure during still stand in neutral position, with a position change in said selecting slide from neutral into drive speed through the emergency valve, a reverse speed coupling is actuated for starting and driving with actuation pressure and the output of said driving unit is transmitted over said hydrodynamic unit and first primary shaft.

3. An electro-hydraulic control for an automatic transmission comprising:

a hydrodynamic unit having a turbine;

a driving unit having a driving shaft and delivering a driving output;

a first and second primary shaft, said shafts being respectively connected to said turbine and to said driving shaft;

a stepped-down planetary coupling gear receiving said driving output, said received output dependent upon a means selected from the group consisting of separate gear speeds and power-split gear speeds;

a selecting slide for choosing a neutral gear position, a drive gear position and a reverse gear position;

an electronic device communicating with said selecting slide with a plurality of solenoid valves kept in a zero position by a spring means communicating with said electronic device;

a hydraulic pressure means including a pressure source, pressure-and switch valves, and dampers for actuating speed shift couplings and brakes;

an emergency valve designed as a stop valve capable of operating in mutual relationship said solenoid valves and shift couplings controlling a highest speed gear and reverse gear; and wherein said emergency valve comprises:

a recessed sleeve valve having three control pistons on one end thereof with the same diameters, a control piston at a second end thereof with a larger diameter than that of the control pistons and a stop pin on said second end;

a recessed cylindrical bore wherein said sleeve valve is supported in an axially sliding fashion, said bore being provided with annular spaces cooperating with said control pistons;

a pressure spring arranged in a spring area of said bore, said spring being wound around said stop pin, and pressing against said sleeve valve; and a plurality of feed lines leading into and exiting from said annular spaces transmitting therethrough an actuating pressure medium.

* * * * *